(12) United States Patent
Liu

(10) Patent No.: US 7,583,673 B2
(45) Date of Patent: Sep. 1, 2009

(54) NETWORK PROCESSOR FOR FORWARDING PACKETS IN AN IP NETWORK

(75) Inventor: Shaowei Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 429 days.

(21) Appl. No.: 11/511,049

(22) Filed: Aug. 28, 2006

(65) Prior Publication Data

US 2007/0053355 A1    Mar. 8, 2007

Related U.S. Application Data

(63) Continuation of application No. PCT/CN2006/001088, filed on May 24, 2006.

(30) Foreign Application Priority Data

Jun. 25, 2005    (CN)    ........................ 2005 1 0078792

(51) Int. Cl.
     *H04L 12/56*    (2006.01)
(52) U.S. Cl. ........................ 370/392; 370/428; 370/469; 712/32; 718/100
(58) Field of Classification Search ........................ None
See application file for complete search history.

(56) References Cited

U.S. PATENT DOCUMENTS

| | | | |
|---|---|---|---|
| 6,606,704 B1* | 8/2003 | Adiletta et al. ............... | 712/248 |
| 6,661,794 B1 | 12/2003 | Wolrich et al. | |
| 6,934,951 B2* | 8/2005 | Wilkinson et al. .......... | 718/107 |
| 7,376,952 B2* | 5/2008 | Katti et al. ................... | 718/102 |
| 7,391,776 B2* | 6/2008 | Venkatachalam et al. | 370/395.1 |
| 2002/0054594 A1* | 5/2002 | Hoof et al. ................... | 370/389 |
| 2003/0043848 A1* | 3/2003 | Sonksen ...................... | 370/474 |
| 2003/0163589 A1* | 8/2003 | Bunce et al. ................. | 709/250 |
| 2005/0125514 A1 | 6/2005 | Balakrishnan | |
| 2006/0251071 A1* | 11/2006 | Oh et al. ...................... | 370/390 |

FOREIGN PATENT DOCUMENTS

CN         1437816 A      8/2003

OTHER PUBLICATIONS

Wen et al., "The Research of IXP2400 Network Processor and the implementation of Multithread in Its MEs," Computer Engineering and Applications, vol. 9 (2004).

* cited by examiner

*Primary Examiner*—Daniel J Ryman
*Assistant Examiner*—Brian Roberts
(74) *Attorney, Agent, or Firm*—Leydig, Voit & Mayer, Ltd.

(57) ABSTRACT

A network processor, including: a programmable Application Specific Integrated Circuit (ASIC) module, with one or more main forwarding hardware pipelines for a main forwarding upon packet; a MicroEngine (ME) module, including one or more programmable ME's for an assistant forwarding through software; designated Steps in the main forwarding hardware pipelines are further connected with each other through a judging unit which is correspondingly connected with the designated ME in the ME module, for judging whether a packet processed by the Step in the main forwarding hardware pipeline ahead of the judging unit needs assistant forwarding, if it needs, the judging unit informs the corresponding ME to perform the assistant forwarding, otherwise, notifies the Step behind the judging unit to perform the main forwarding. The present invention provides high flexibility and reliability, avoids negative influences when adding new services and does not require much instruction space.

10 Claims, 5 Drawing Sheets

US 7,583,673 B2

NETWORK PROCESSOR FOR FORWARDING PACKETS IN AN IP NETWORK

This application is a continuation of International Patent Application No. PCT/CN2006/001088, filed May 24, 2006, which claims priority to Chinese Patent Application No. 200510078792.5, filed Jun. 25, 2005, all of which are hereby incorporated by reference.

FIELD OF THE TECHNOLOGY

The present invention relates to forwarding technologies in modern communication systems, and more particularly to a network processor applicable for packet forwarding in Internet Protocol (IP) networks.

BACKGROUND OF THE INVENTION

In modern communication systems, during a process of transmitting information from a source to a destination, the information usually needs to be forwarded by a forwarding device. Up to now, the development of the forwarding technology experiences the following five stages.

The first generation forwarding technology mainly adopts software-based centralized forwarding and bus switching technologies. FIG. 1 is a schematic diagram illustrating a structure of a first generation forwarding device. As shown in FIG. 1, interface cards connect to a Central Process Unit (CPU) through internal buses; wherein, the CPU is responsible for all transaction processes, including route collections, forwarding and device managements, etc. After receiving a packet, interfaces on the interface cards transfer the packet to the CPU through the internal bus, and the CPU transfers the packet to another port after all processing steps. Such forwarding devices can be constituted by a computer with several inserted interface cards.

The second generation forwarding technology mainly adopts a Cache technology. FIG. 2 is a schematic diagram illustrating a structure of a second generation forwarding device. As shown in FIG. 2, a Cache is added to the interface card of the first generation forwarding device, and some commonly used routing information are saved in the interface card using the Cache technology. Since network users usually visit a few sites, most packets can be forwarded directly through a routing table in the Cache of the interface card, so as to reduce the demand for the bus and the CPU. Only when the routing information of the packet can not be found in the Cache, the packet will be sent to the CPU to be forwarded.

The third generation forwarding technology adopts a full distributed architecture, i.e. a technology with independent routing and forwarding functions. The forwarding device includes a main control board and service boards. Wherein, the main control board is used to manage the whole equipment, collect and calculate routes, and distribute the calculated forwarding table to each service board. FIG. 3 is a schematic diagram illustrating a structure of a service board of a third generation forwarding device. As shown in FIG. 3, the service board includes several forwarding CPUs, each CPU independently forwards packets according to the stored routing table. In addition, the rapid development of buses makes it possible to forward packets between service boards through buses without the help of the main control board, which realizes parallel high speed processing, and thereby dramatically improves the processing ability of the forwarding device.

The fourth generation forwarding technology adopts hardware to implement all the details in the forwarding process. FIG. 4A is a schematic diagram illustrating a structure of a fourth generation forwarding device. As shown in FIG. 4A, large-scale Field Programmable Gate Array (FPGA) forwarding engines or more advanced programmable Application Specific Integrated Circuit (ASIC) forwarding engines are adopted to replace the CPUs in each service board of the third generation forwarding device, which solves the problems of a low performance, a low port density and a low velocity of the CPU. In addition, a switching matrix, which adopts a CrossBar technology or a shared memory technology, is adopted to replace the switching bus in the third generation forwarding device. Typically, early Gigabit Switch Routers (GSRs), which have a capacity of Gigabit, are the fourth generation forwarding devices.

FIG. 4B is a schematic diagram illustrating a structure of an FPGA/AISC forwarding engine in the fourth generation forwarding device. As shown in FIG. 4B, a forwarding service flow 41 is integrated in the FPGA/AISC forwarding engine 40. The forwarding service flow generally includes one or more hardware pipelines, wherein, a hardware pipeline may include several Steps, such as Step 1, Step 2 . . . Step n, and each step is implemented by a corresponding programmable device. In addition, the FPGA/AISC forwarding engine 40 also includes a special hardware unit 42, such as, a hardware interface unit used for visiting external memories, a unit used for primary link layer analysis of packets, an interface processing unit connected with a Ternary Content-Addressable Memory (TCAM), or an internal integrated Media Access Control (MAC) unit, etc. Since all the service forwarding flows are implemented by hardware in the fourth generation forwarding technology, its performance is excellent, stable and reliable.

The fifth generation forwarding technology adopts programmable Network Processors (NPs) exclusively designed for IP networks. FIG. 5A is a schematic diagram illustrating a structure of a fifth generation forwarding device. As shown in FIG. 5A, the hardware structure of the fifth generation forwarding device technically inherit that in the fourth generation forwarding device, it also includes the forwarding engine and the switching matrix, but adopts the programmable NPs especially designed for the IP networks as the forwarding engines in the key IP service flows. Typically, Huawei NE 80/40 series products etc. are the fifth generation forwarding devices.

The NP is a programmable device especially used in the communication field, such as, packet processing, protocol analysis, routing search, voice/data aggregation, firewall and Quality of Service (QoS). Currently, the NP generally refers to a network processor of integrated services, i.e. a network processor for implementing diversified forwarding functions.

FIG. 5B is a schematic diagram illustrating a structure of the NP which is adopted as the forwarding engine in the fifth generation forwarding device. As shown in FIG. 5B, the NP 50 usually consists of several Micro Engines (MEs) 51, a hardware co-processor 52, a special hardware unit 53 and an embedded CPU 54. The MEs 51 operate in parallel and implement the forwarding control process in software. The co-processor is used for improving the processing performance of some complicated, standard operations, such as memory operations, searching algorithms of the routing table, QoS congestion control algorithms and traffic scheduling algorithms, etc. It combines the flexibility and the high performance of the service. The special hardware unit 53 is a hardware accelerator, which is optional based on practical situations. For example, the unit can be a unit used for primary analysis of a packet when the packet entering into the NP according to the configured type of the port, or a unit used for generating sequence numbers and guaranteeing the forwarding order, or a unit used for accelerating the visit to external memories, or a hardware used for automatic memory management. The embedded CPU54 acts as an intermediate between the NP and other periphery CPUs, and can also be used for some NP management functions or link layer protocol processing functions, and also some ME software diagnosing and debugging functions of the NP.

The performance of the NP is high. Since several or even dozens of forwarding MEs, hardware co-processors and hardware accelerators are integrated in the NP, many algorithms in the forwarding process can be implemented by hardware, and thereby achieve a higher searching, forwarding performance, and realize "hardware forwarding" on the premise that the ME implements the complicated congestion control, queue scheduling, flow classifying and QoS functions. For example, some NPs, such as NPs supporting 2.5 Gbps forwarding speed, NPs supporting 10 Gbps and NPs supporting 40 Gbps, are currently put into commercial use.

The function expansion of the NP is flexible. Since the ME is programmable, once there are new technologies or demands, it is very convenient to realize them through software programming, it is also convenient to add or remove system functions by adding or removing software modules. Therefore, it is possible to tailor customized development for special user demands, which means, to develop products satisfying different requirements of users through adding or removing modules within a short period of time. While in the case of the FPGA which is adopted to implement the function extension, it is necessary to modify pin functions, debug and update once again. In most cases, it is also necessary to change other special hardware units, which brings about potential trouble to the reliability of the system. If the AISC is adopted to implement the function extension, since the new functions can not be added, the chip must be re-designed and replaced. As to the development period, the software development usually takes 6 months, but the implementation of the FPGA needs 18 months, and the ASIC costs even longer, generally 2~3 years. Along with the development of C programming language being adopted in the NPs, the software development cycle will become shorter and shorter. Therefore, comparing with the fourth generation forwarding technology, the NP has a more flexible function expansion capacity.

The reliability of the NP is high. Most NP systems are implemented by one or two chips, and all chips have undergone strict tests and diversified anti-interference and devastating experiments by manufactures, which can dramatically improve the reliability of the NP systems. Therefore, the NP is very suitable for developing data communication products of telecommunication level.

SUMMARY OF THE INVENTION

The present invention is to provide a Network Processor (NP), which combines advantages of existing Application Specific Integrated Circuit (ASIC) forwarding engines and existing NPs. The NP of the present invention has high flexibility and reliability, has no impact on performance when adding services, and does not require much instruction space.

The technical solution of the present invention is implemented as follows:

A network processor, including:

a programmable ASIC module, with one or more main forwarding hardware pipelines used for performing main forwarding upon packets; and a Micro Engine (ME) module, including one or more programmable MEs, wherein, the ME is used for completing assistant forwarding upon packets by software; wherein, designated Steps in the main forwarding hardware pipeline are further connected with each other through a judging unit, which is connected with a corresponding designated ME in the ME module, and used for judging whether a packet which has been processed by a Step in the main forwarding hardware pipeline ahead of the judging unit needs an assistant forwarding, and if the packet needs an assistant forwarding, the judging unit informs the corresponding ME to perform the assistant forwarding, otherwise, informs a Step in the main forwarding hardware pipeline behind the judging unit to perform the main forwarding.

The present invention may have the following advantages:

1. Since hardware pipelines of the ASIC module are adopted to perform the basic forwarding functions of the NP, the basic forwarding performance of the services will not decrease with the increase of new services, thus guaranteeing the reliability of the basic forwarding, and solving the problem that the existing NP will be affected by the new added services.

2. A large part of the forwarding is implemented by the hardware pipeline of the ASIC module in the NP of the present invention, those implemented by software in the ME are only some new forwarding functions, or some application character functions which are difficult to be implemented by the hardware pipeline and do not require much performance. Therefore, the required instruction space in the ME of the NP of the present invention is dramatically reduced.

3. As to the extended forwarding functions, they can be processed by switching to the ME when executing the main process. Since the ME is programmable, the extended functions can be implemented by updating software anytime, which solves the problem of inflexibility of the fourth generation forwarding technology. Meanwhile, the short development cycle of the software also solves the disadvantage of the ASIC which needs a long period to change the chip, and further reduces the costs brought about by the chip update of the ASIC.

4. The NP in the present invention is of a systemic structure, and it integrates the advantages of the existing AISC forwarding technology and the existing NP forwarding technology, which represents the direction of future forwarding engines.

DETAILED DESCRIPTION OF THE INVENTION

The invention will be described in more detail hereinafter with reference to the accompanying drawings and embodiments.

The core theory of the invention is that the currently matured main forwarding is solidified through an integrated circuit, during which some judging points are left to allow packets that need special processing to be switched to the ME through them, and there are micro codes in the ME, which have special assistant forwarding functions and perform the diversified service processes.

Thus, the following disadvantages of the fourth generation forwarding technology can be solved:

The developing cycle of the fourth generation forwarding technology is long. According to statistics in the art, the developing cycle of an ASIC forwarding engine is at least three times that of the software to develop a service character.

The fourth generation forwarding technology is inflexible. It is impossible to add new characters. Since all the service forwarding are implemented by hardware, once a new character needs to be added, the FPGA/AISC must be re-designed, and the user has to replace the hardware, which is not favorable for saving user's investment. Furthermore, current forwarding devices are mainly used in the IP field, the rapid development of the IP technologies makes the conflict more serious.

The fourth generation forwarding technology requires a high developing cost. It costs as high as a million dollars to develop a FPGA/AISC; therefore, if the chip needs frequent updating due to the new added characters, the cost will be very high.

In addition, the disadvantages of the existing NP also can be solved:

1. The performance of the NP decreases along with the increase of services. Since all forwarding functions are implemented by software, once a new function is needed, it will be necessary to add several judging sentences in the main process of the software, so as to treat special packets by branch processes, which results in the decrease of the performance of the main service. Especially when there are many new service functions, the conflict will become more serious.

2. There is a problem in instruction space of the NP. To ensure a high reading speed of instructions of the NP, all the instructions are stored in the chip. However, the instruction space cannot be very large, generally tens of thousands instructions, due to the limitation of the integration level. With the increase of the services, a great many instructions are needed to implement all the service functions in software, but the instruction space in the chip cannot accommodate so many instructions.

Figure 1:
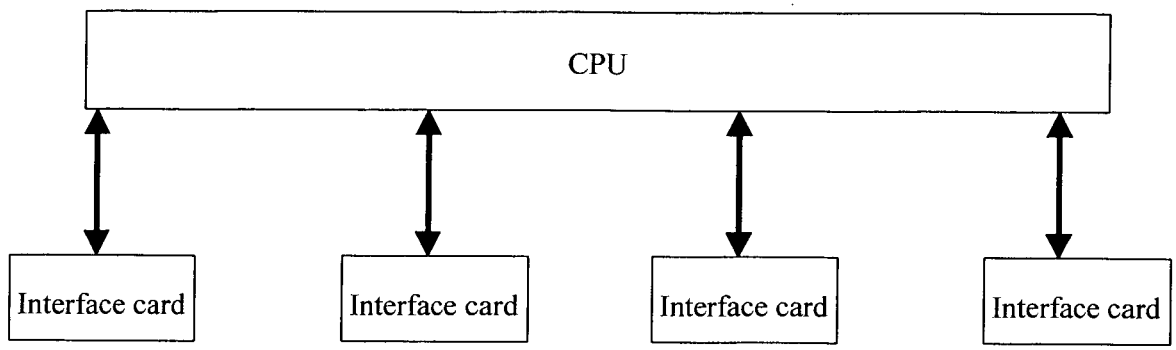
FIG. 1 is a schematic diagram illustrating a structure of a first generation forwarding device.
Figure 2:
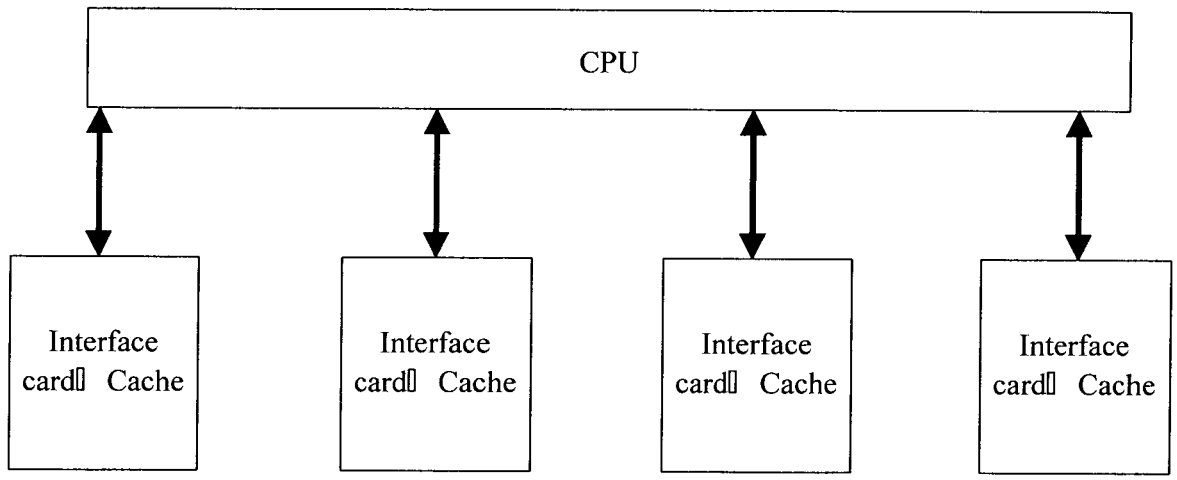
FIG. 2 is a schematic diagram illustrating a structure of a second generation forwarding device.
Figure 3:
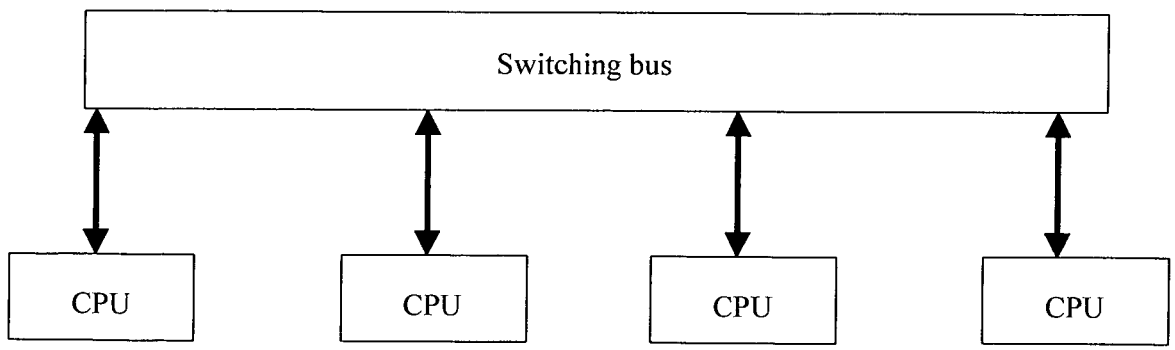
FIG. 3 is a schematic diagram illustrating a structure of a service board in a third generation forwarding device.
Figure 4A:
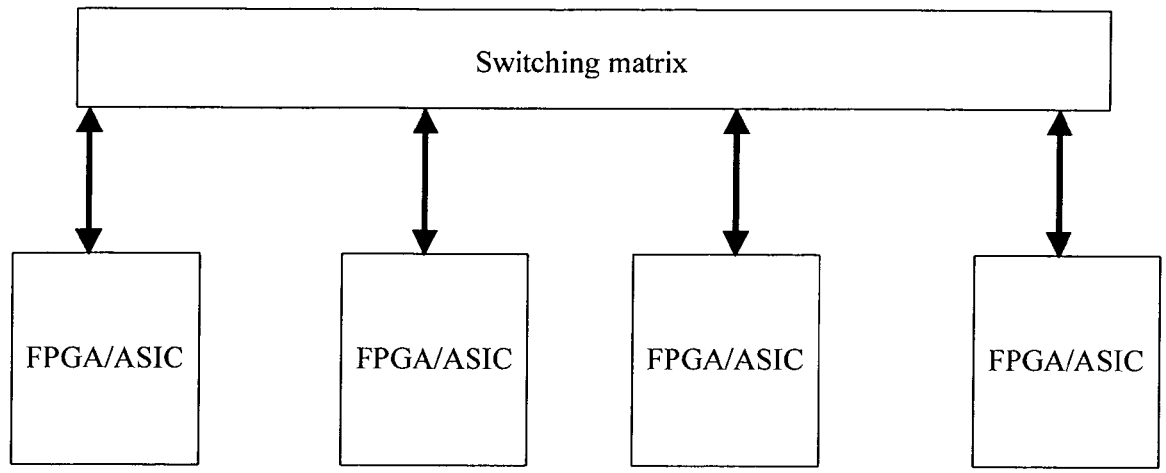
FIG. 4A is a schematic diagram illustrating a structure of a fourth generation forwarding device.
Figure 4B:
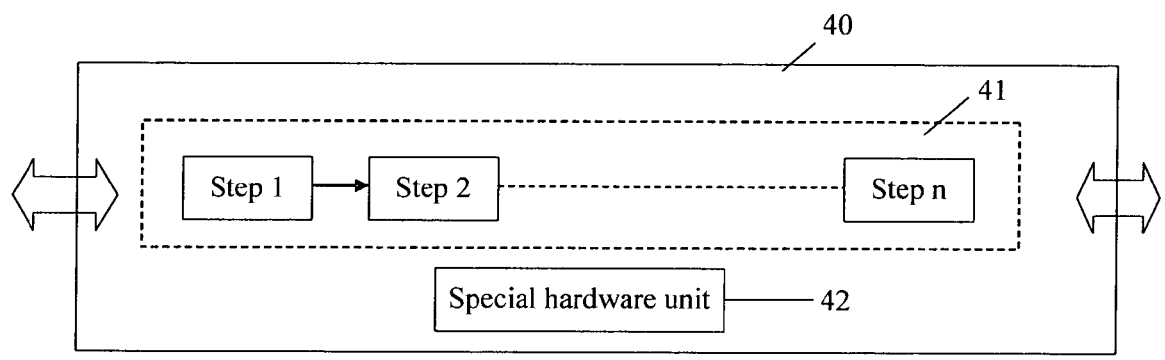
FIG. 4B is a schematic diagram illustrating a structure of an AISC forwarding engine in the fourth generation forwarding device.
Figure 5A:
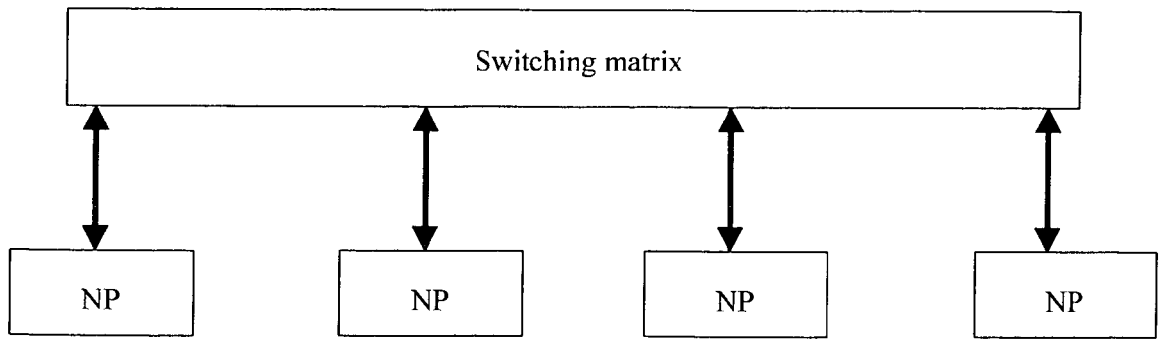
FIG. 5A is a schematic diagram illustrating a structure of a fifth generation forwarding device.
Figure 5B:
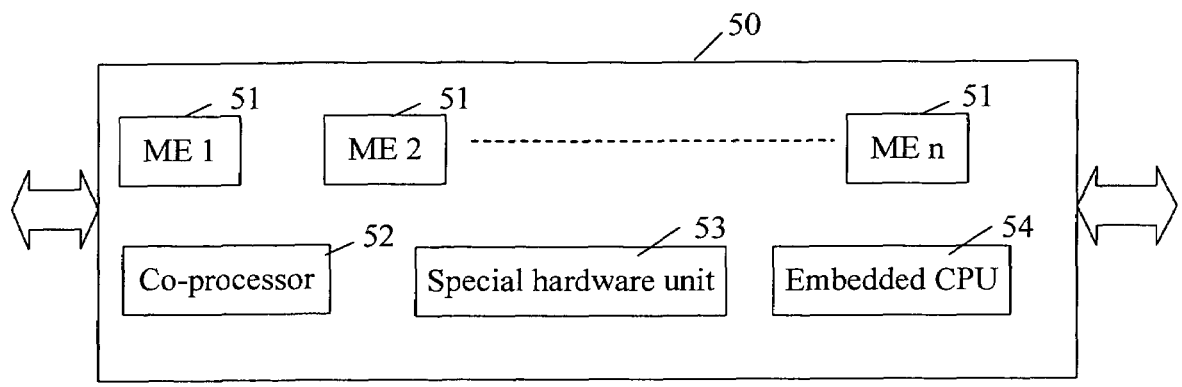
FIG. 5B is a schematic diagram illustrating a structure of an NP forwarding engine in the fifth generation forwarding device.
Figure 6:
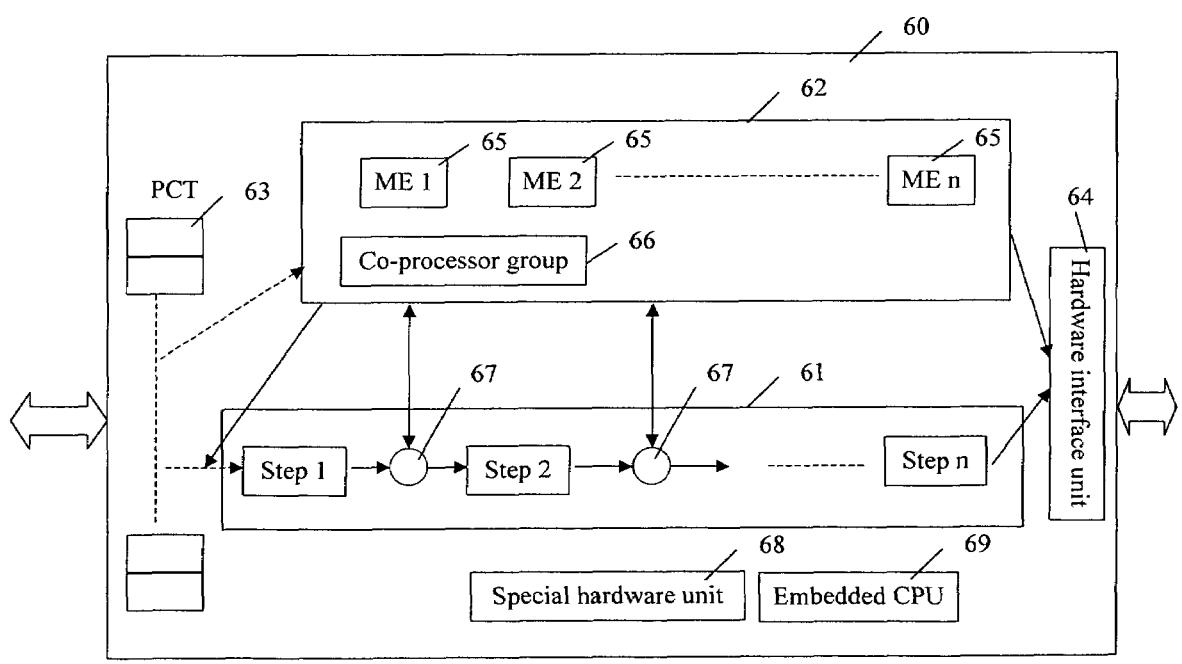
FIG. 6 is a schematic diagram illustrating a structure of an NP according to an embodiment of the present invention.

FIG. 6 is a schematic diagram illustrating a structure of an NP according to an embodiment of the present invention. As shown in FIG. 6, an NP 60 mainly includes an ASIC module 61 and an ME module 62. Wherein, the ASIC module 61 is implemented similarly to the ASIC forwarding engine in the existing fourth generation forwarding technology. The ASIC module 61 can include one or more main forwarding hardware pipelines. As shown in FIG. 6, the ASIC module 61 which includes one forwarding hardware pipeline is taken as an example, the forwarding hardware pipeline includes many Steps, such as Step 1~Step n. Those mature forwarding processes are implemented by an existing integrated circuit pipeline, and are solidified in the main forwarding hardware pipeline of the ASIC module. The above-mentioned mature forwarding processes can be: link layer forwarding, bridge forwarding, IPv4 forwarding, IPv6 forwarding, MPLS forwarding, multicast forwarding, etc. Wherein, the link layer forwarding can be: Ethernet link layer processes, PPP link layer processes, HDLC link layer processes, etc. The integrated circuit pipelines for implementing the above-mentioned forwarding can be independently set in the main forwarding hardware pipeline, or can be randomly combined and integrated in the main forwarding hardware pipeline. Meanwhile, the output result of the main forwarding pipeline is transmitted to a hardware interface unit 64 through which the packet is forwarded out of the NP 60.

The ME module 62 integrates several MEs 65 which have all the characters of the ME in the existing NP. The ME 65 is programmable, it can be used for realizing the new added service character functions in the service forwarding process and some application character functions which are difficult to be implemented by the hardware pipeline and do not require much on performance, such as tunnel functions, segmentation functions, reassembly functions, processes need to be re-used between processes, etc. Different to the main forwarding hardware pipeline, the above-mentioned forwarding functions performed by the ME are called assistant forwarding functions.

The ME module 62 further includes a co-processor group 66, connected with a special ME and used for assisting the ME and improving the performance of the ME, e.g. the hardware unit used for primary packet identifying, referring to the co-process technologies between the ME and the co-processor in the existing NP.

In order to implement the assistant forwarding function in the ME 65, judging units 67 are inserted between some key Steps, such as between the Step 1 and the Step 2, in the hardware pipeline of the ASIC module 61. The judging units 67 are connected with the ME 62 through buses or other data lines. Trigger conditions with special functions of the ME 65 are stored in the judging unit 67 to judge the processing result of the former Step or a part of the content of a packet being processed. For example, the processing result of the former Step to be judged can be: a searching result of a table, a judging and processing result of the forwarded packet, a monitor result of traffic, etc. The content of the packet to be judged can be: an important field of the packet header used for forwarding in the packet content, a field value of the packet needs to be modified according to the searching result of the table, etc. The stored trigger conditions are different as to different content, determined by specific service processes. Herein judging whether the above-mentioned content accords with the stored trigger condition, if it accords with the trigger condition, informing the ME connected with the judging unit to perform the assistant forwarding to the packet, otherwise, informing the next Step of the main forwarding hardware pipeline to process the packet. Thus some special packets or packets need special forwarding can be forwarded by the software in the ME.

Figure 7:
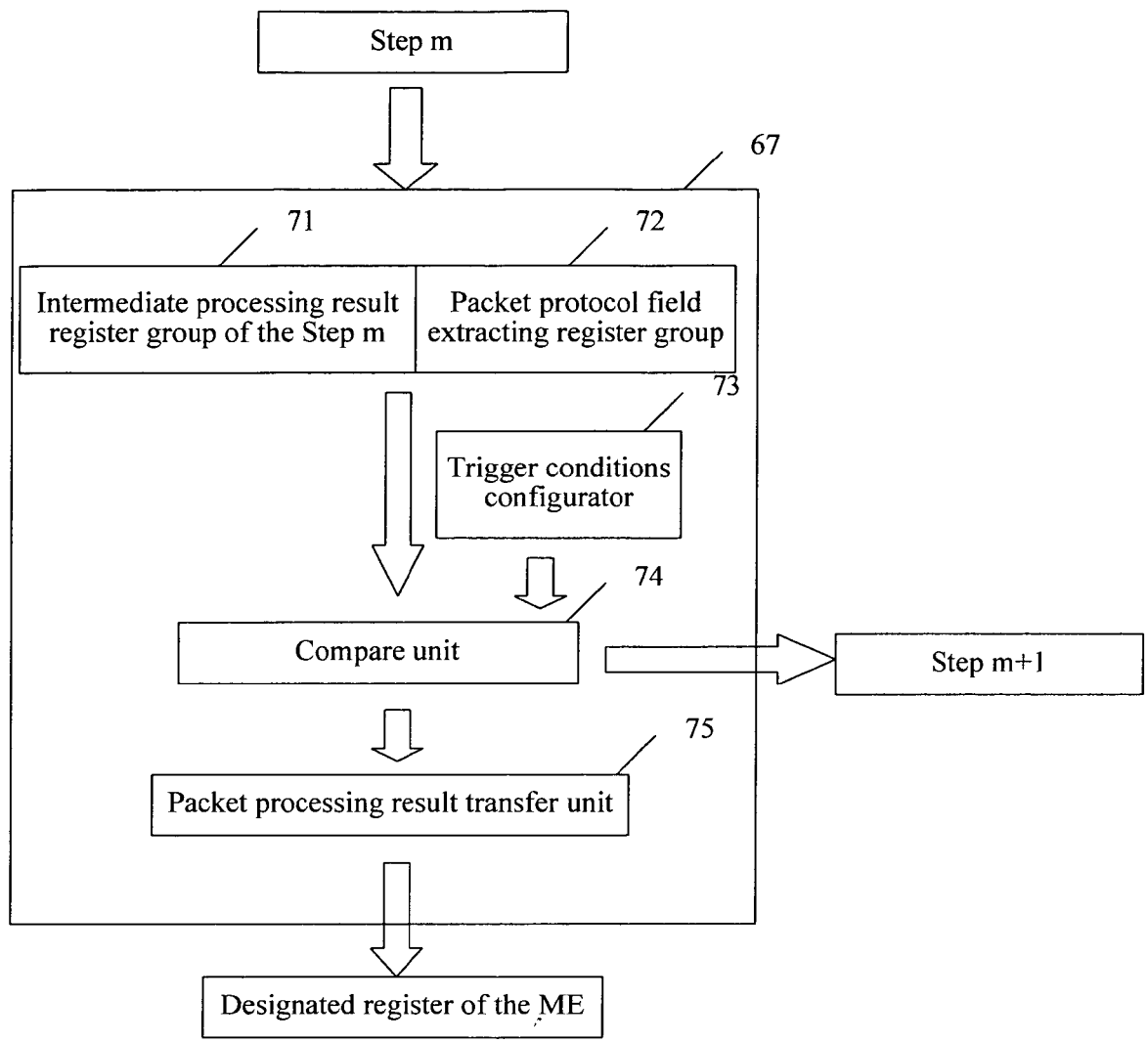
FIG. 7 is a schematic diagram illustrating a structure of a judging unit of the NP according to an embodiment of the present invention.

FIG. 7 is a schematic diagram illustrating a structure of the judging unit 67 according to an embodiment of the present invention. As shown in FIG. 7, supposing that the judging unit 67 is set between the Step m and the Step m+1 of the ASIC pipeline, the judging unit 67 further includes:

an intermediate result register group 71 in the Step m, used for receiving the intermediate processing results of the Step m, storing the intermediate result and the compared result of the comparison unit 74;

a packet protocol field extracting register group 72, used for extracting data value from a special protocol field of the forwarded packet head, and storing the extracted value;

a trigger condition configuration unit 73, which is also a register group, used for configuring trigger conditions for the ME, wherein, the trigger conditions correspond to the data stored in the register group 71 and the register group 72. The trigger conditions can be configured by software, and the matching way can be a ternary mask match, a full match or a range match. The size of the register group 73 can be corresponding to that of the register group 71 and the register group 72. Or the size of the register group 73 is smaller than that of the register group 71 and the register group 72, but under this situation, the positions of the values, which correspond to each trigger condition in the configuration unit 73, in the register group 71 and the register group 72 is further necessary to be determined;

a compare unit 74, used for comparing values on designated positions of the register group 71 or 72 with the corresponding trigger conditions in the trigger condition configuration unit 73, and further judging whether the data satisfies the trigger condition, and if the trigger condition is satisfied, then the compare unit 74 determines that the condition of transferring the packet to the ME for process is satisfied and informs the following packet processing result transfer unit 75 to copy the processing result of the Step m and the storage descriptor to a designated register of the ME, thereby the packet can be transferred to the ME 65 group to process; otherwise, it informs the Step m+1 to process the current processing result of the Step m;

the Packet processing result transfer unit 75, used for copying the above-mentioned processing result of the trigger conditions and the storage description of the packet to the designated register of the ME after it receives the information from the compare unit, informing the ME to visit the designated register and processing the data in it. Alternatively, the ME visits the designated register in a polling manner, and processes the data in the register.

After the packet being processed, the ME 65 can transfer the processing result to a section of the hardware pipeline, e.g. the Step 2, to continue with the Step 2 and subsequent steps, or transfer the packet out of the NP 60 directly from the last out-interface, i.e. the hardware interface unit 64, according to practical forwarding requirements of the service.

Since one NP usually supports multiple ports, a port configuration module is added at the entrance of the chip. The port configuration module is a Port Config Table (PCT) 63 implemented by hardware or software, and each port is configured as a unit of the PCT, which can store switching configuration information of the port, for determining whether the packet entering the NP port is switched to the ASIC module 60 to be processed by the hardware pipeline or is switched to the ME module 62 to be processed by the ME connected with the corresponding port. For example, the port with the existing services can be switched to the hardware pipeline to process, while the port with new services can be switched to the ME with the corresponding new service processing functions. Wherein, the ME can be connected with certain sections of the main forwarding hardware pipeline according to service processing requirements, or it can be connected with the output interface of the NP, i.e. connected with the hardware interface unit 64. If the packet is processed by the ME, after the processing of the ME, the packet will be switched to a section of the pipeline according to the requirement, e.g., be switched to a section ahead of the Step 1, or a section between the Step 1 and the Step 2, and then be processed by subsequent Steps, or be switched directly to the hardware interface unit 64 to be transferred out of the NP 60.

The PCT can also store types of the ports, e.g., Ethernet ports or POS ports, etc., it can also store some attribute information of the ports, e.g., whether the port allows receiving MPLS packets, whether the port can receive multicast packets, etc, and the PCT can also be used for filtering the received packets.

In addition, the NP 60 further includes a special hardware unit 68 and an embedded CPU 96. The special hardware unit 69 is used for assisting the main forwarding hardware pipeline and the ME to perform the forwarding; therefore, it is also called a hardware accelerator, which is optional in practical applications. For example, the accelerator can be a primary analyzing unit used for analyzing a packet when the packet enters the NP according to the configured type of the port, or a unit used for generating sequence number and guaranteeing the forwarding order, or a unit used for accelerating access to external memories, or a hardware unit used for automatically managing the memory, etc. The embedded CPU 96 acts as an intermediate unit between the NP and other periphery CPUs, and it can also perform some NP management functions or some link layer protocol processing functions, as well as some diagnosing and debugging functions of the NP ME software.

There is only one hardware pipeline being provided in the ASIC module 61 as shown in FIG. 6, however, there can be multiple hardware pipelines in practical applications, e.g., one hardware pipeline in the IPv4 forwarding, and one in the IPv6 forwarding, etc. The compare unit can be added between any key Steps of each hardware pipeline, thus the packets which need special processes can be transferred to the ME 65, and the implementation is the same as that in the above-mentioned hardware pipeline.

Figure 8:
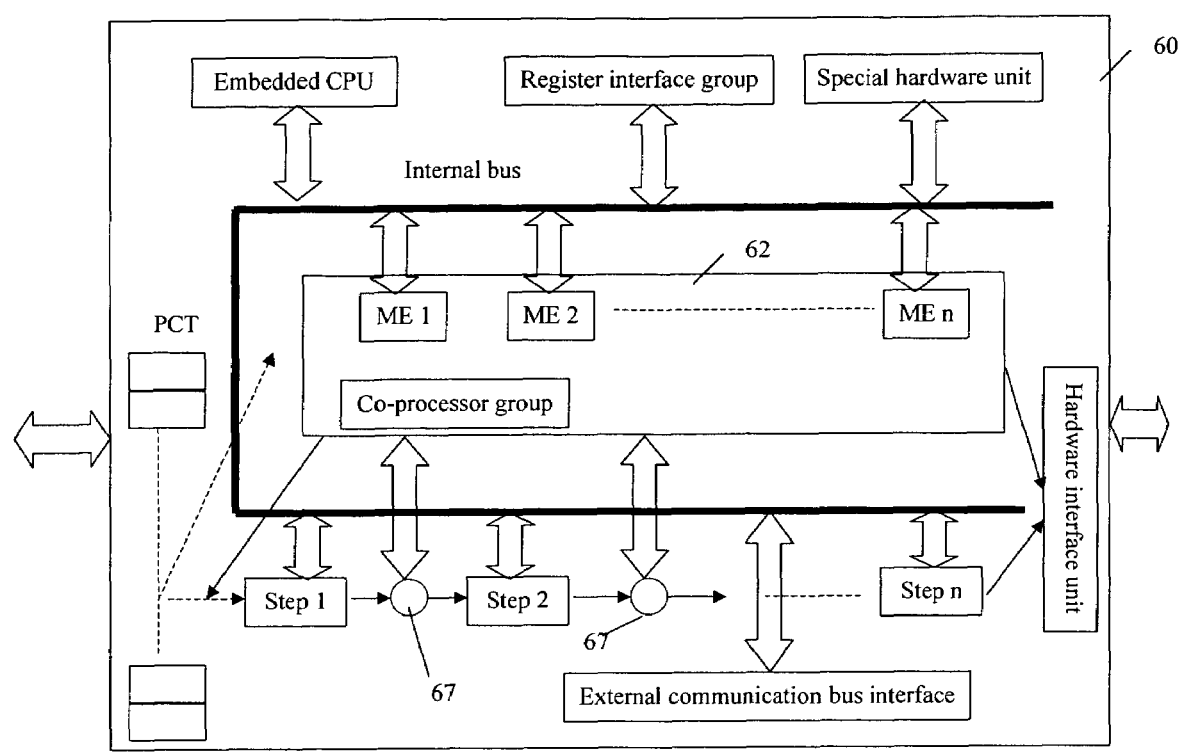
FIG. 8 is a schematic diagram illustrating a detailed unit structure of the NP according to an embodiment of the present invention.

FIG. 8 is a schematic diagram illustrating a detailed structure of unit connections of the NP according to an embodiment of the present invention. As shown in FIG. 8, in the NP, each Step in the main forwarding hardware pipeline, each ME in the ME module, the embedded CPU, the interface group of the registers, the external communication bus interface unit and the special hardware unit are connected by the internal buses, therefore the communications of these units can be realized. The compare unit in the pipeline is directly connected with the ME module or the ME to implement communication.

In the NP, a large part of the forwarding is implemented by the hardware pipeline of the ASIC module in the NP. Those implemented by software in the ME are only some new forwarding functions or some application character functions which are difficult to implement by the hardware pipeline and do not require much on performance. Therefore, the required instruction space in the ME of the NP is dramatically reduced.

Since hardware pipelines of the ASIC module are adopted to perform the basic forwarding functions of the network processor, the basic forwarding performance of the services will not decrease with the increase of the new services, thus solving the problem that the existing NP will be affected by the new added services.

Meanwhile, as to the extended forwarding functions, they can be processed by switching to the ME when executing the main process. Since the ME is programmable, the extended functions can be implemented by updating software anytime, which solves the problem of inflexibility of the fourth generation forwarding technology. Meanwhile, the short development cycle of the software also solves the disadvantage of the ASIC which needs a longer period to update the chip, and further reduces the cost brought about by the chip update of the ASIC.

The above-mentioned embodiments are only the preferred embodiments of the present invention, which are not used to confine the protection scope of the present invention. Those skilled in the art can know from the accompanying drawings and claims, that various changes, modifications and variations can be made without departing from the spirit and scope of the present invention as defined in the following claims.

What is claimed is:

1. A Network Processor (NP), comprising:
    a programmable ASIC module, with at least one main forwarding hardware pipeline used for performing a main forwarding upon a packet; and
    a Micro Engine (ME) module, including at least one programmable ME used for completing an assistant forwarding upon the packet by software; wherein each of the at least one main forwarding hardware pipeline comprises a plurality of Steps, wherein designated, Steps in the at least one main forwarding hardware pipeline are further connected with each other through a judging unit which is connected with a corresponding designated ME in the ME module, the judging unit is used for judging whether a packet, which has been processed by a Step ahead of the judging unit in the at least one main forwarding hardware pipeline, needs an assistant forwarding, if the packet needs the assistant forwarding, the judging unit informs the corresponding ME to perform the assistant forwarding, otherwise, informs a Step behind the judging unit in the at least one main forwarding hardware pipeline to process the packet.

2. The NP according to claim 1, wherein, the at least one main forwarding hardware pipeline comprises at least one of:
    an integrated circuit pipeline, used for link layer processes;
    an integrated circuit pipeline, used for bridge forwarding;
    an integrated circuit pipeline, used for IPV4 forwarding;
    an integrated circuit pipeline, used for IPV6 forwarding;
    an integrated circuit pipeline, used for Multi-Protocol Label Switch (MPLS) forwarding; and
    an integrated circuit pipeline, used for multicast forwarding.

3. The NP according to claim 2, wherein, the integrated circuit pipeline used for link layer processes comprises at least one of:
    an integrated circuit pipeline, used for Ethernet link layer processes;
    an integrated circuit pipeline, used for Point-to-Point Protocol (PPP) link layer processes; and
    an integrated circuit pipeline, used for High-level Data Link Control (HDLC) link layer processes.

4. The NP according to claim 1, further comprising:
    a port configuration module, which is connected with the at least one main forwarding hardware pipeline and the ME module, used for storing port switching configuration information, and switching the packets entering into a port to the at least one main forwarding hardware pipeline or to the ME module according to the switching configuration information.

5. The NP according to claim 1, wherein, the judging unit stores trigger conditions for the assistant forwarding, the judging unit determines whether a packet needs an assistant forwarding by judging whether the content or the processing result of the packet processed by the Step in the at least one main forwarding hardware pipeline ahead of the judging unit satisfies the stored trigger conditions.

6. The NP according to claim 1, wherein, the ME module further comprises co-processors, connected with the at least one programmable ME and used for assisting the at least one programmable ME to perform the assistant forwarding.

7. The NP according to claim 1, further comprising:
    a hardware accelerator, which is connected with the at least one main forwarding hardware pipeline used for assisting the at least one main forwarding hardware pipeline and the at least one programmable ME with the forwarding.

8. The NP according to claim 1, wherein, the at least one programmable ME is further connected with a designated sector of the at least one main forwarding hardware pipeline, or connected with an out-interface of the NP, the processing result of the at least one programmable ME is returned to the designated sector of the at least one main forwarding hardware pipeline which is connected with the at least one programmable ME, or is directly output to the out-interface of the NP.

9. The NP according to claim 1, wherein, the judging unit further comprises:
    an intermediate result register, used for storing intermediate processing results of the Step ahead of the judging unit in the at least one main forwarding hardware pipeline;
    a packet protocol field extraction register, used for extracting and storing the content of a protocol field of the forwarded packet;
    a trigger condition configuration unit, used for storing the trigger conditions of the assistant forwarding;
    a compare unit, used for comparing and determining whether the content in the intermediate result register or in the packet protocol field extraction register satisfies the corresponding trigger condition in the trigger condition configuration unit, if the trigger condition is satisfied, the compare unit informs a packet processing result transfer unit to process, otherwise, informs the Step behind the judging unit in the at least one main forwarding hardware pipeline to process; and
    the packet processing result transfer unit, used for copying the intermediate result and a storage descriptor of the packet to a register designated by the at least one programmable ME for further processing after receiving the information from the compare unit.

10. The NP according to claim 9, wherein, the trigger conditions in the trigger condition configuration unit can be matched by: a full match, a ternary mask match, or a range match.

* * * * *